July 14, 1959  J. R. MILES  2,894,431
OPTICAL OBJECTIVE
Filed Aug. 8, 1957
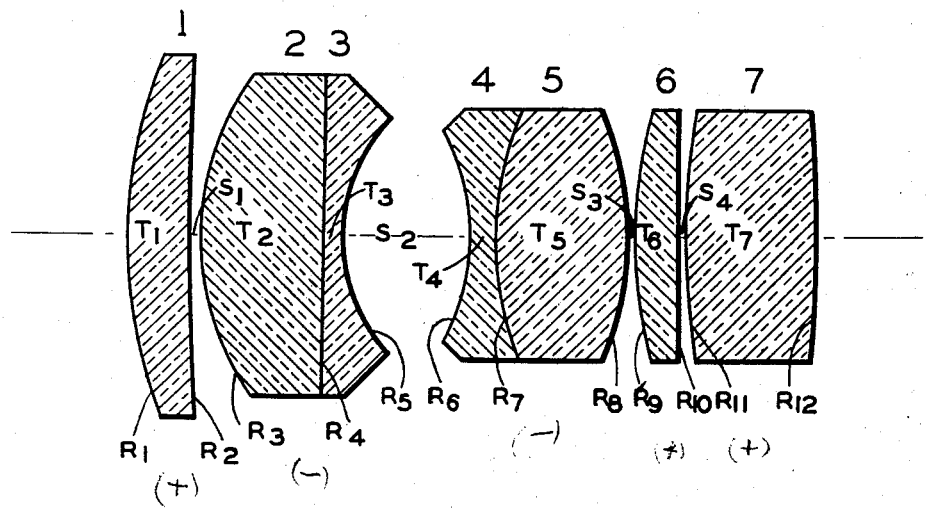
INVENTOR
JOHN R. MILES
BY
HIS AGENT

United States Patent Office

2,894,431
Patented July 14, 1959

2,894,431

OPTICAL OBJECTIVE

John R. Miles, Glenview, Ill., assignor to White-Rodgers Company, St. Louis, Mo., a corporation of Delaware Application August 8, 1957, Serial No. 677,050

2 Claims. (Cl. 88—57)

This invention relates to highly corrected optical objectives of large aperture for projection, photography, and other purposes. More particularly, it relates to an objective generally of the Double Gauss type corrected for chromatic and spherical aberration, curvature of field, distortion, and astigmatism, and in this instance consisting of seven individual elements, four of which form a pair of compound, dispersive, meniscus components having their concave surfaces facing each other, and the other three of which form a front collective component and two rear collective components, wherein "front" refers to the longer conjugate side of the objective and "rear" refers to the shorter conjugate side.

It is well known that correction of chromatic aberration may be improved in an objective of this kind by replacing single lens elements with cemented doublets consisting of two lens elements having substantially different "V" values, and that to reduce coma or off-axis spherical aberration, it is commonly believed that the substitution of such cemented components or the addition of several single lens elements is necessary.

An object of this invention is to provide a relatively low cost, $f./1.5$ objective of this kind of high luminosity in which a higher degree of correction of chromatic aberration, coma, and off-axis aberration is achieved than heretofore by novel selection of glass and configuration, particularly the shape of the rear element, rather than by employing such commonly known, cost increasing expedients as the substitution of cemented compound components for simple components, or by increasing the total number of individual lens elements, or increasing the number of kinds of glass.

A further object is to provide an objective of this kind particularly suited for projection in which the front collective component and the front dispersive component are considerably larger in diameter than the rear dispersive and collective components, and in which the spacing and thickness of these rear components is such as to space the larger diameter front components sufficiently forward from the rear side of the objective to permit mounting it in lens mounts of existing and currently manufactured film projectors.

The accompanying figure of the drawing is a longitudinal, sectional view of a preferred form of a seven element, $f./1.5$, 100 mm. focal length objective constructed in accordance with the present invention. In the drawing element 1 is a positive meniscus collective component, elements 2 and 3 are, respectively, convex-plano and plano-concave and are cemented together to form a front meniscus dispersive component. Elements 4 and 5 are, respectively, bi-concave and bi-convex and are cemented together to form a rear meniscus dispersive component, and elements 6 and 7 are, respectively, convex-plano and bi-convex positive collective components.

Further specific data of the illustrated objective is compiled in the following table wherein $R_1$ to $R_{12}$ designate the surface radii of curvature of the lens elements, with plus radii having their centers to the right of the surfaces and minus radii having their centers to the left of the surfaces; $T_1$ to $T_7$ designate the thickness of the lens elements on the aixs; $S_1$ to $S_4$ designate the axial air space between components; $N_1$ to $N_7$ designate the indices of refraction of the lens elements in sodium "D" light; and $V_1$ to $V_7$ designate reciprocal dispersion ratios of the lens elements. Radii, thickness, and air space are given in millimeters.

[Focal Length 100 mm.   Relative Aperture $f/1.5$.]

| Radius | Thickness | Air Space | Refractive Index | Reciprocal Dispersion Ratio |
|---|---|---|---|---|
| $R_1 = + 97.0$ | $T_1 = 12.6$ | | $N_1 = 1.613$ | $V_1 = 59.5$ |
| $R_2 = +456.3$ | | $S_1 = 1.3$ | | |
| $R_3 = + 54.5$ | $T_2 = 24.0$ | | $N_2 = 1.613$ | $V_2 = 59.5$ |
| $R_4 = \infty$ | $T_3 = 4.0$ | | $N_3 = 1.5704$ | $V_3 = 48.1$ |
| $R_5 = + 33.3$ | | $S_2 = 25.1$ | | |
| $R_6 = - 46.2$ | $T_4 = 5.4$ | | $N_4 = 1.6545$ | $V_4 = 33.8$ |
| $R_7 = + 63.9$ | $T_5 = 26.2$ | | $N_5 = 1.620$ | $V_5 = 60.0$ |
| $R_8 = - 63.9$ | | $S_3 = 0.6$ | | |
| $R_9 = + 97.0$ | $T_6 = 9.1$ | | $N_6 = 1.620$ | $V_6 = 60.0$ |
| $R_{10} = \infty$ | | $S_4 = 0.6$ | | |
| $R_{11} = +136.85$ | $T_7 = 26.9$ | | $N_7 = 1.620$ | $V_7 = 60.0$ |
| $R_{12} = -276.9$ | | | | |

It will be appreciated that the foregoing specific data is given by way of illustration and that variations within limits may be made without departing from the spirit of the invention as set forth in the following claims.

I claim:

1. A photographic or projection objective of high luminosity corrected for spherical and chromatic aberration, coma, astigmatism, distortion, and field curvature comprising in combination seven lens elements in axial alignment; the first of said lens elements being a meniscus-shaped, positive lens element with its concave surface to the rear, the second and sixth of said lens elements being convex-plano positive lens elements, the third of said lens elements being a plano-concave negative lens element, the fourth of said lens elements being a bi-concave negative lens element, and the fifth and seventh of said lens elements being bi-convex lens elements, and in which the thicknesses of the lens elements are, respectively; 10% to 13%, 22% to 26%, 3% to 5%, 5% to 6%, 25% to 27%, 8% to 10%, and 25% to 27% of the focal length of said objective, and in which the air spaces between said lens elements are substantially, respectively; 0% to 1.5%, 0% to .2%, 24% to 26%, 0% to .2%, 0% to .8%, and 0% to .8% of the focal length of said objective, and in which the second and third, as well as the fourth and fifth, of said lens elements may be cemented together for greater light transmission or other advantages, and in which the indices of refraction in sodium "D" light are from 1.610 to 1.625 for the first, second, fifth, sixth, and seventh lens elements, and in which the index of refraction in sodium "D" light is from 1.565 to 1.575 for said third lens element, and in which the index of refraction is from 1.650 to 1.660 for said fourth lens element, and in which the reciprocal dispersion ratio "V" is from 58 to 61 for said first, second, fifth, sixth, and seventh lens elements, and in which the reciprocal dispersion ratio "V" is from 47 to 49 for said third lens element, and in which the reciprocal dispersion ratio "V" is from 32 to 35 for said fourth lens element, and in which the first radius of curvature of said first lens element is from 95% to 99% of the focal length of the complete objective, and in which the second radius of curvature of said first element is from 450% to 460% of the focal length of the complete objective, and in which the first radius of curvature of said second lens element is from 51% to 55% of the focal length of the complete objective, and in which the second radius of curvature of said second lens element and the first radius of curvature of said third lens element are substantially infinity, and in which the second radius of curvature of said third lens element is from 31% to 35% of the focal length of the complete objective, and in which the first radius of curvature of said fourth lens element is from 44% to 47% of the focal length of the complete objective, and in which the second radius of curvature of said fourth lens element, the first radius of curvature of said fifth lens element, and the second radius of curvature of said fifth lens element are from 63% to 65% of the focal length of the complete objective, and in which the radius of curvature of the first surface of said sixth lens element is from 95% to 99% of the focal length of the complete objective, and in which the second radius of curvature of said sixth lens element is substantially infinity, and in which the first radius of curvature of said seventh lens element is from 135% to 139% of the focal length of the complete objective, and in which the second radius of curvature of said seventh lens element is from 270% to 290% of the focal length of the complete objective.

2. A 100 millimeter focal length objective for projection and other uses having high luminosity and being corrected for spherical and chromatic aberration, coma, astigmatism, distortion, and field curvature and constructed substantally according to the following data wherein; $R_1$ to $R_{12}$ designate surface radii of curvature in millimeters, with plus radii having their centers to the right of the surface and minus radii having their centers to the left of the surface, $T_1$ to $T_7$ designate axial lens thicknesses in millimeters, $S_1$ to $S_4$ designate axial air spaces between the lenses in millimeters, $N_1$ to $N_7$ designate indices of refraction of the glass in sodium "D" light, and $V_1$ to $V_7$ designate reciprocal dispersion ratios of the glass.

[Focal Length 100 mm.   Relative Aperture $f/1.5$.]

| Radius | Thickness | Air Space | Refractive Index | Reciprocal Dispersion Ratio |
|---|---|---|---|---|
| $R_1 = +\ 97.0$ | $T_1 = 12.6$ |  | $N_1 = 1.613$ | $V_1 = 59.5$ |
| $R_2 = +456.3$ |  | $S_1 = 1.3$ |  |  |
| $R_3 = +\ 54.5$ | $T_2 = 24.0$ |  | $N_2 = 1.613$ | $V_2 = 59.5$ |
| $R_4 = \infty$ | $T_3 = 4.0$ |  | $N_3 = 1.5704$ | $V_3 = 48.1$ |
| $R_5 = +\ 33.3$ |  | $S_2 = 25.1$ |  |  |
| $R_6 = -\ 46.2$ | $T_4 = 5.4$ |  | $N_4 = 1.6545$ | $V_4 = 33.8$ |
| $R_7 = +\ 63.9$ | $T_5 = 26.2$ |  | $N_5 = 1.620$ | $V_5 = 60.0$ |
| $R_8 = -\ 63.9$ |  | $S_3 = 0.6$ |  |  |
| $R_9 = +\ 97.0$ | $T_6 = 9.1$ |  | $N_6 = 1.620$ | $V_6 = 60.0$ |
| $R_{10} = \infty$ |  | $S_4 = 0.6$ |  |  |
| $R_{11} = +136.85$ | $T_7 = 26.9$ |  | $N_7 = 1.620$ | $V_7 = 60.0$ |
| $R_{12} = -276.9$ |  |  |  |  |

References Cited in the file of this patent

UNITED STATES PATENTS

| | | |
|---|---|---|
| 2,019,985 | Lee | Nov. 5, 1935 |
| 2,379,392 | Warmisham | June 26, 1945 |
| 2,398,680 | Warmisham | Apr. 16, 1946 |
| 2,718,173 | Hackman et al. | Sept. 20, 1955 |

FOREIGN PATENTS

| | | |
|---|---|---|
| 565,566 | Germany | Dec. 2, 1932 |
| 647,830 | Germany | July 14, 1937 |
| 522,651 | Great Britain | June 24, 1940 |